(12) United States Patent
Tan et al.

(10) Patent No.: US 11,094,220 B2
(45) Date of Patent: Aug. 17, 2021

(54) INTELLIGENT AUGMENTED REALITY FOR TECHNICAL SUPPORT ENGINEERS

(71) Applicant: International Business Machines Corporation, Armonk, NY (US)

(72) Inventors: Jefferson Tan, Southbank (AU); Hidemasa Muta, Southbank (AU); Bruno de Assis Marques, Southbank (AU); Sengor Kusturica, Southbank (AU)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/167,728

(22) Filed: Oct. 23, 2018

(65) Prior Publication Data

US 2020/0126445 A1    Apr. 23, 2020

(51) Int. Cl.
| | | |
|---|---|---|
| G09B 19/00 | (2006.01) | |
| G06F 3/14 | (2006.01) | |
| G06T 11/00 | (2006.01) | |

(52) U.S. Cl.
CPC ......... G09B 19/003 (2013.01); G06F 3/1454 (2013.01); G06T 11/00 (2013.01)

(58) Field of Classification Search
CPC ......... G09B 19/003; G09B 5/06; G06T 11/00; G06F 3/1454; G06F 3/147; G09G 2340/12
See application file for complete search history.

(56) References Cited

U.S. PATENT DOCUMENTS

| | | | | |
|---|---|---|---|---|
| 6,031,519 A | * | 2/2000 | O'Brien | G03H 1/0005 |
| | | | | 345/156 |
| 9,910,518 B2 | * | 3/2018 | Bliss | G06F 3/017 |
| 10,732,721 B1 | * | 8/2020 | Clements | G06F 3/167 |
| 2002/0067372 A1 | | 6/2002 | Friedrich et al. | |

(Continued)

FOREIGN PATENT DOCUMENTS

| | | |
|---|---|---|
| WO | WO 2014/100688 A2 | 6/2014 |
| WO | WO 2015/125066 A1 | 8/2015 |

OTHER PUBLICATIONS

Zhu et. al. "An authorable context-aware augmented reality system to assist the maintenance technicians", Int. Journal Advanced Manufacturing Technology, Published online: Aug. 24, 2012 see pp. 13-14. (Year: 2012).*

(Continued)

*Primary Examiner* — Maurice L. McDowell, Jr.
(74) *Attorney, Agent, or Firm* — Joseph Petrokaitis, Esq.; McGinn I.P. Law Group, PLLC.

(57) ABSTRACT

A support method, system, and computer program product, include identifying a repair or a maintenance task, determining an expertise level of the local engineer, receiving a procedure for performing the repair or the maintenance task, the procedure including a series of steps, instructional information associated with each step, and technical information associated with the repair or the maintenance task, based on the expertise level of each engineer, filtering the instructional information, and the technical information in the procedure to exclude information already known by the engineer, presenting, via an augmented reality device, a first step of the series of steps and the associated filtered information.

14 Claims, 5 Drawing Sheets

(56) References Cited

U.S. PATENT DOCUMENTS

| | | | | |
|---|---|---|---|---|
| 2015/0339607 | A1* | 11/2015 | Nielsen | G06Q 10/06 |
| | | | | 705/7.26 |
| 2016/0071319 | A1* | 3/2016 | Fallon | G06T 19/006 |
| | | | | 345/633 |
| 2016/0103437 | A1 | 4/2016 | Alfredsson et al. | |
| 2018/0324229 | A1* | 11/2018 | Ross | H04L 65/4015 |
| 2018/0365621 | A1* | 12/2018 | Merg | B60S 5/00 |
| 2019/0026930 | A1* | 1/2019 | Kritzler | G02B 27/0172 |
| 2019/0114816 | A1* | 4/2019 | Tham | G06T 11/60 |
| 2019/0172266 | A1* | 6/2019 | Short | G06T 19/006 |
| 2019/0250873 | A1* | 8/2019 | Blume | G06F 3/011 |
| 2019/0295325 | A1* | 9/2019 | Montgomerie | G06F 3/1462 |
| 2020/0034622 | A1* | 1/2020 | Thakurta | G05B 15/02 |

OTHER PUBLICATIONS

Mel, et al. "The NIST Definition of Cloud Computing". Recommendations of the National Institute of Standards and Technology. Nov. 16, 2015.

* cited by examiner

INTELLIGENT AUGMENTED REALITY FOR TECHNICAL SUPPORT ENGINEERS

BACKGROUND

The present invention relates generally to a support method, and more particularly, but not by way of limitation, to a system, method, and recording medium for providing authorization of multiple responding agencies to join in shared streams in emergency situations.

In a data center scenario where problems need immediate resolution, there must be a clear understanding of the current state, the problem at hand, and the solution steps. Such understanding, however, is hindered by the deficiencies of the conventional techniques. For example, much of the current state of devices, their modules, and all interactions therein, are not monitored, and therefore require some digging to expose. For example, while one can monitor packet counts across interfaces, one does not monitor for access list changes. The event may be logged (as they should), but the actual state is not on a heads-up display for ready reference by a trouble shooter at a data center.

A great deal about devices is not intimately known by an engineer. Support relies on manuals where one could go to locate information about available commands and functionality, for example, but one does not have them memorized for ready reference. Also, effective and immediate presentation of such knowledge to engineers can be crucial. An illustrative diagram can be significantly better than plain English paragraphs or bullet points, just as an instructional video is better than a user manual. More so, a live demonstration (e.g., demo) with an expert who can answer questions, or perhaps provide immediate feedback while observing one's interaction with a system.

SUMMARY

In an exemplary embodiment, the present invention can provide a computer-implemented support method of facilitating interaction between a remote engineer and a local engineer, the method including identifying a repair or a maintenance task, determining an expertise level of the local engineer, receiving a procedure for performing the repair or the maintenance task, the procedure including a series of steps, instructional information associated with each step, and technical information associated with the repair or the maintenance task, based on the expertise level of the local engineer, filtering the series of steps, the instructional information, and the technical information in the procedure to exclude steps and information already known by the engineer, and presenting, via an augmented reality device, a first step of the filtered series of steps and the associated filtered information.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which FIG. 1 exemplarily shows a high-level flow chart for a support method 100.

DETAILED DESCRIPTION

Figure 1:
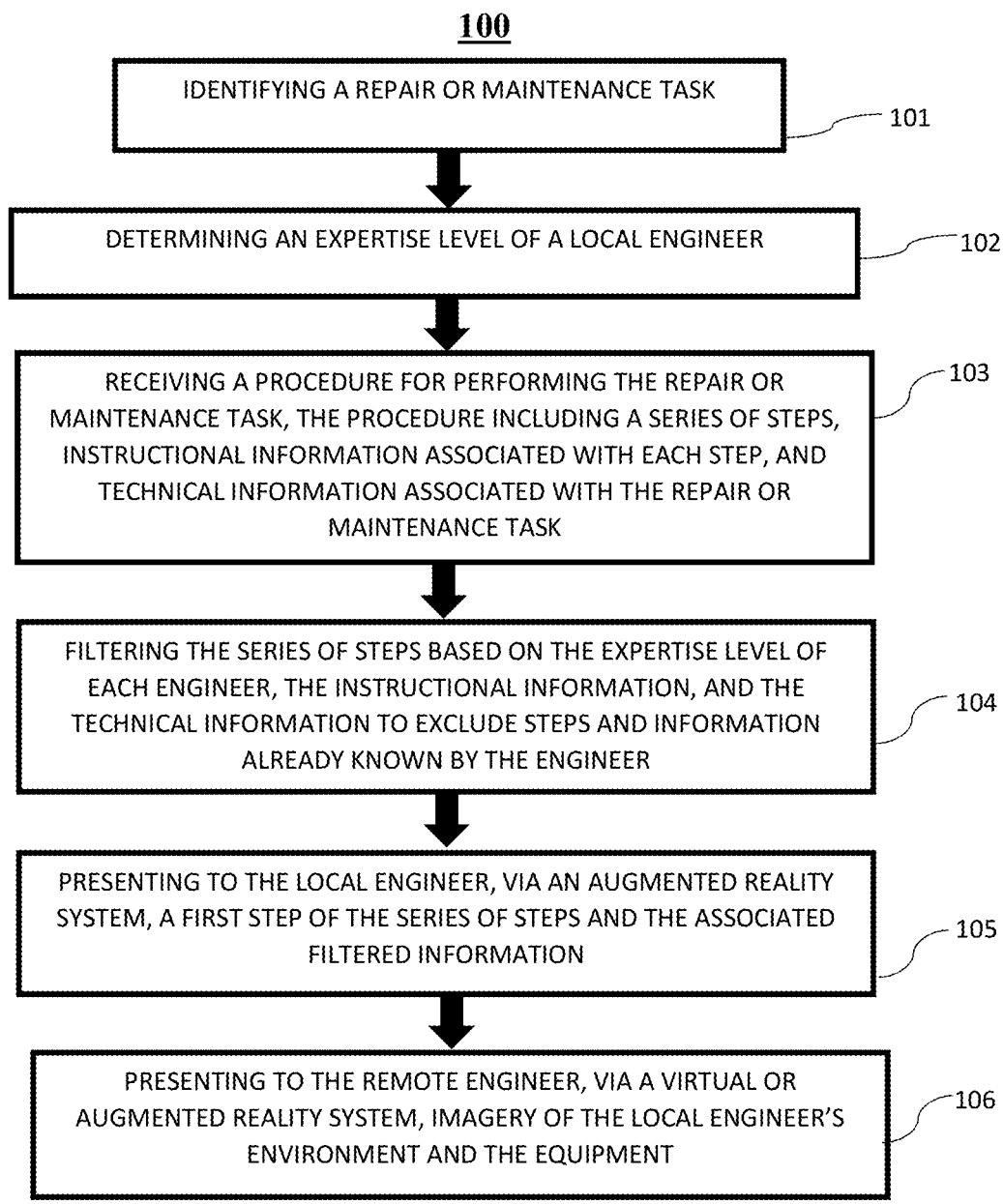

The invention will now be described with reference to FIG. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

With reference now to the example depicted in FIG. 1, the support method 100 includes various steps to provide first (e.g., local) engineers with a mixed reality interactive environment to facilitate interactions with remote engineers, documentation about the target machinery, and the target machinery itself. Whereas augmented reality renders an overlay of virtual objects on top of reality, mixed reality anchors virtual objects to real objects, which lets local engineers interact with real devices and components when they interact with virtual objects. The invention interfaces with artificial intelligence (AI), which can effectively fit the delivery to the engineer's level of expertise and the specific maintenance stage or step at which he or she is. The AI will also process the engineer's historical activities for similar jobs. That is, the invention can filter instructional information for performing the repair based on an identified expertise level of the local engineer and the remote engineer. It is noted that a "remote" engineer is an engineer not at a location of the repair or maintenance. Preferably, the "remote" engineer is a second engineer at a datacenter that has access to a computer. A "local" engineer is an engineer at the location of the repair or maintenance.

Figure 3:
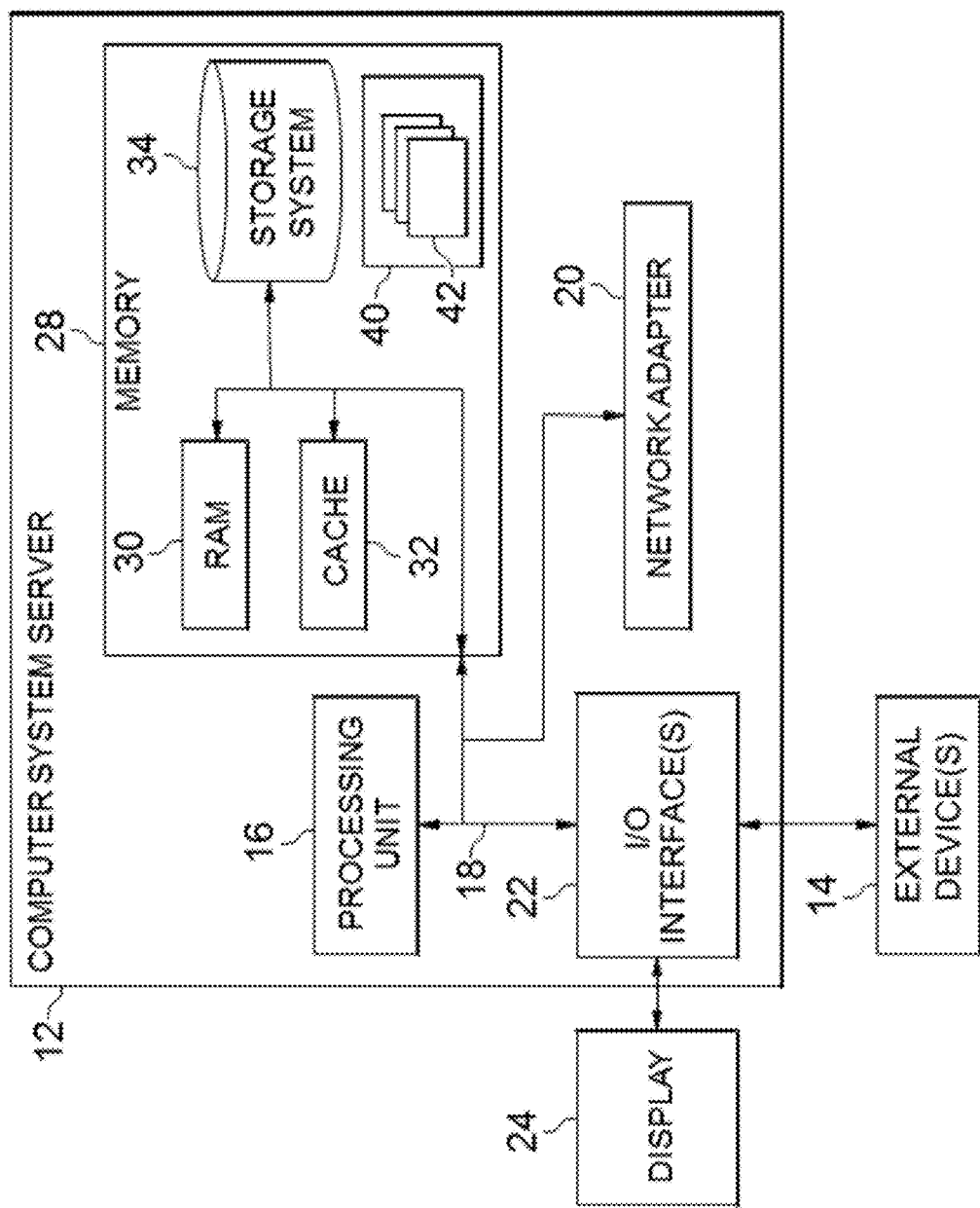
FIG. 3 depicts a cloud computing node 10 according to an embodiment of the present invention.

As shown in at least FIG. 3, one or more computers of a computer system 12 according to an embodiment of the present invention can include a memory 28 having instructions stored in a storage system to perform the steps of FIG. 1.

Thus, the support method 100 according to an embodiment of the present invention may act in a more sophisticated, useful and cognitive manner, giving the impression of cognitive mental abilities and processes related to knowledge, attention, memory, judgment and evaluation, reasoning, and advanced computation. A system can be said to be "cognitive" if it possesses macro-scale properties—perception, goal-oriented behavior, learning/memory and action—that characterize systems (i.e., humans) generally recognized as cognitive.

Although one or more embodiments (see e.g., FIGS. 3-5) may be implemented in a cloud environment 50 (see e.g., FIG. 4), it is nonetheless understood that the present invention can be implemented outside of the cloud environment.

Figure 2:
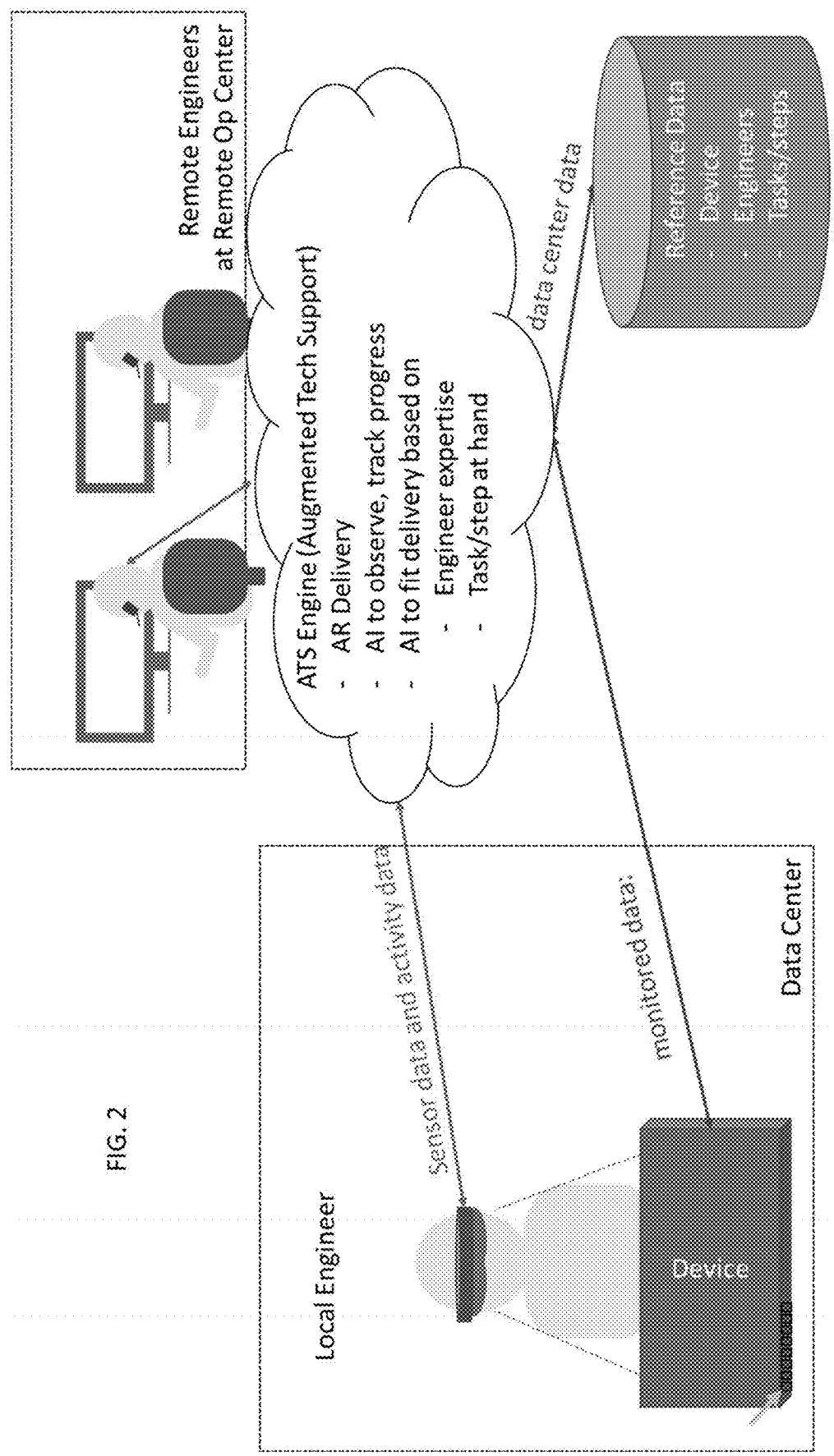
FIG. 2 exemplarily depicts an implementation of the method 100 according to an embodiment of the present invention.

With reference generally to FIGS. 1-2, the invention facilitates mixed reality interaction among engineers, for those on the ground and those at remote locations, data relevant to the target machinery, including environmental sensory input, and the machinery itself, and AI to suit delivery of assistance to the specific engineers on hand.

Augmented Reality (AR) multimedia uses graphical representations to present data more effectively. The AR blends representations in with physical reality for greater accuracy and convenience, such as in associating data with devices or device modules in the viewable space, using such visual cues as arrows and colors, etc. For example, the engineer can physically tap a switch port, and the AR engine will bring up graphs and status indicators associated with it. Such blended objects can be manipulated further to expand or contract, move out of the way, remove, drill down, etc.

Local and remote engineers can work together in the same virtual space. The remote engineer can be rendered in the local engineer's view and his activities presented in the virtual display (e.g., a view of his terminal interactions and a graphical cue, an arrow, to associate the remote engineer's work, with a component in his view of the physical device). Likewise the operation is conducted in the other direction.

Artificial Intelligence (AI) can observe ongoing interactions between engineers and machinery, and provide feedback. The AI also collects data about and around these interactions that can go into a body of knowledge about the engineer and about the task. The invention also uses data from the engineer, whether via headgear, wearable, or a separate device, coupled with a body of knowledge about the machinery, and past interactions by other engineers with similar machinery. A critical use of AI is in some understanding of the work context, homing in on pertinent information, excluding volumes of related but currently irrelevant data, or data from knowledge that are flagged to be well-known to a particular engineer.

The intelligent assistant can present options to try, with functionality for the engineer to examine them from the perspective of past applications or how they relate to the current situation. The latter involves an understanding of work contexts, down to particular steps of some granularity, by which inference can be made to locate an ongoing task in the bigger picture.

This level of understanding must become part of the paradigm, which looks at work contexts consisting of discrete steps, each of which is associated with a body of relevant knowledge with varying degrees of proximity, order and interdependence.

Technical engineers are profiled for their levels of expertise, which are modeled carefully and thoroughly, within this paradigm. This is done through an information model that revolves around certain building blocks: (a) devices D', (b) a piece of knowledge K', (c) an engineer E', and (d) maintenance job J'. Each device D' consists of multiple pieces of knowledge K'(D') about device D', which can be considered particular sections of its manuals. Associated with one or more devices is a job J'(D*, K*), which works with a set of devices D* and pieces of knowledge K* that are relevant to those devices for this job. On the other side of this model is the engineer, who "consists" of multiple pieces of knowledge known by the him or her, K'(D'). The granularity of these pieces of knowledge works better in smaller chunks. This allows a fine-tuned modeling of the engineer's expertise.

Beyond declared capabilities and past work logs, it should be possible to observe and analyze work history in order to correctly record experience with specific machinery and issues, as well as outcomes. Modest improvements can provide significant improvements to the assistive experience, such as presenting previously unseen references or references for unfamiliar machinery while hiding references for machinery and work with which the engineer is known to be intimately familiar. The progress of work can also be subjected to observation and useful inferences. Progress is subject to reasonable measurement if it can be tested for a target condition, such as a component going from an inactive or disabled state to an active or enabled state. Also, unnecessary movement or commands in the data center, or too much time spent on a particular step, or delays between the start of a step and the measurable outcomes for that step, can be timed by software. These go towards efficiency or lack thereof. Erroneous commands entered in the console, which can be observed from the console logs as syntax errors, will also add to profiling the engineer and adjusting assistance levels. Repeated syntax errors can also prompt an offer to bring up help documentation for that particular command or component.

In one embodiment, a mix of cameras and sensors as part of the VR/AI system can be helpful in blending in real-time input from physical surveillance with virtual enrichment of the viewing output for engineers, both on the ground wearing it and the remote engineers using normal screens or another VR/AI system. However, noise-cancelling headphones may be necessary for the local engineer, due to expected noise levels in data centers. The VR/AI system can include microphones, one being oriented towards the user. Similar head-mounted displays from other developers may have varying support for noise-cancelling audio.

The invention can be implemented with the standard Simple Network Management Protocol (SNMP) for monitoring real-time status data from network devices as well as servers. Extensions to SNMP allow the monitoring of non-standard data as well, and there are many tools to collect both standard and non-standard data via SNMP. All major operating systems and network devices from all major manufacturers support SNMP. Furthermore, various network and system management tools record events collected via SNMP traps, or received via remote logging tools, e.g., syslog. It is therefore possible to access both historical and real-time events, analyze them for key findings, and present both the raw logs as well as inferred knowledge to engineers.

With reference to FIG. 1, the method 100 provides first (e.g., local) engineers with a mixed reality interactive environment to facilitate interactions with second (e.g., remote) engineers, documentation about the target machinery, and the target machinery itself.

In step 101, a repair or maintenance task is identified by either a local engineer or a remote engineer.

In step 102, an expertise level of a local engineer and, optionally, an expertise level of a remote engineer is determined. The skill level can be modeled using a simplified paradigm of a job J' which consists of pre-planned steps in guiding the engineer as well as observing progress, even if progress is indicated by ticking off steps electronically for each completed step. Later, an assessment of the engineer's performance for these steps can be supplied by the evaluating remote engineer. This is additionally useful for audit purposes, as well as in a feedback system of constantly improving these steps via review cycles, where expert engineers can learn from mistakes made by field engineers. The same paradigm of auditable steps and work aspects will be used as the basis of data with which to train the AI classifier that profiles engineers. For example, the skill level can be determined based on past activity, unnecessary movements between steps, how long the engineer takes to perform a task relative to other engineers, etc. The engineers can manually input (or derive from social media or Internet sources) work experience, education, level, etc.

In step 103, a procedure for performing the repair or the maintenance task is received, which, as per the information model, is a job J' associated with the devices to work on as well as pieces of knowledge about the devices that are relevant to the job. The job includes a series of steps, and associated knowledge as instructional information associated with each step, and technical information associated with relevant devices for the repair or the maintenance task.

In step 104, based on the expertise level of each engineer, the series of steps, the instructional information, and the technical information is filtered to exclude information already known by the engineer. That is, the series of steps to repair or maintain a task is customized for the remote engineer and the local engineer based on identifiable characteristics of each engineer (e.g., skill, experience, etc.). The artificial intelligence can determine which steps to filter. This simple algorithm (in the next three paragraphs below) prepares the steps for the job, and it begins with a complete set of steps and assistive information with no filtering involved.

For each job step, examine the associated pieces of knowledge k1, k2, . . . kn, which include paragraphs of text, figures and command code listings.

For each k1, k2, . . . kn, if the engineer's profile indicates a knowledge level of 4 or 5 (maximum), set this k aside. It will not be displayed unless requested. For example, if the engineer shows familiarity with where the management port is, a diagram showing its location is not necessary to display.

Display the steps with filtered assistive information. This will be subject to design considerations, such as a hierarchy of text that begin with sections collapsed until expanded by the engineer.

In step 105 in FIG. 1, a first step of the series of steps and the associated filtered information is presented to the local engineer, via an augmented reality system.

In step 106, imagery of the local engineer's environment and the equipment may be presented to the remote engineer, via a virtual or augmented reality system.

Therefore, the remote engineer can monitor the local engineer's task via the augmented reality system (e.g., watch through a camera, receive information through sensors, and talk to the engineer through a microphone).

And, the method can continuously loop such that the skill of the engineers are updated to filter assistive information as well as updating the repair and maintenance task as the tasks are performed.

For example, as depicted in FIG. 2, the local engineer and the remote engineer can cooperatively perform a repair in real-time using more accurate data points by the remote engineer being able to "see through the eyes" of the local engineer via the augmented reality device. That is, the data stream from the local engineer, from the device being fixed (e.g., repair), and from a data center (e.g., sensors in the premises and on the local engineer's person), and commands from a remote engineer are fed into the invention. This in turn adjusts the steps of repair based on progress monitored from device status as well as explicitly ticked off by either engineer, e.g., the device logs indicate that a previously disabled interface is now enabled means the step to do so is completed. The invention will also adjust the level of assistive information continuously, based on the demonstrated skill level of the engineers involved. Note that the same steps may come up multiple times in the same job, e.g., how to add a firewall rule, and the job requires adding several. It may not be necessary to repeatedly display the syntax to the engineer.

Therefore, the invention provides for a method of identifying an equipment requiring maintenance In addition, the invention allows a local engineer to receive over the shoulder coaching by a remote engineer using, for example, optical see-through technology and augmented reality feedback at real-time through smart device/smart glasses and providing an AR view of the local engineer's equipment and environment to receive step-by-step instructions as well as computer drawings and designs that show how to perform a particular maintenance activity augmented on the visualization and allow remote users to draw on what the user is seeing.

By the above, the invention includes advantages over prior techniques by using AI to tailor-fit assistance to the engineers and the work context, improving throughput/productivity, avoiding mistakes through real-time verification of the engineer's activities versus the task at hand, combining what can be seen, sensed and monitored with references, and facilitating collaboration among engineers on the ground and remote. Efficiency is gained with AI reducing the glut of information that is not required for the task at hand, when taking into account the engineer's proficiency level. The collaborative environment improves cooperation, reduces mistakes, and the shared views will be more effective in conveying information, compared to verbal descriptions and observations over the phone. Richer information is also shared more effectively here, such as thermal sensor readings, shared video, which can be replayed as required, etc. Efficiency is also gained by blending the mixed reality perception with actual machine interfaces, e.g., status rendered in color, counters in graphs, etc.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring again to FIG. 3, computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external circuits 14 such as a keyboard, a pointing circuit, a display 24, etc.; one or more circuits that enable a user to interact with computer system/server 12; and/or any circuits (e.g., network card, modem, etc.) that enable computer system/server 12 to communicate with one or more other computing circuits. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
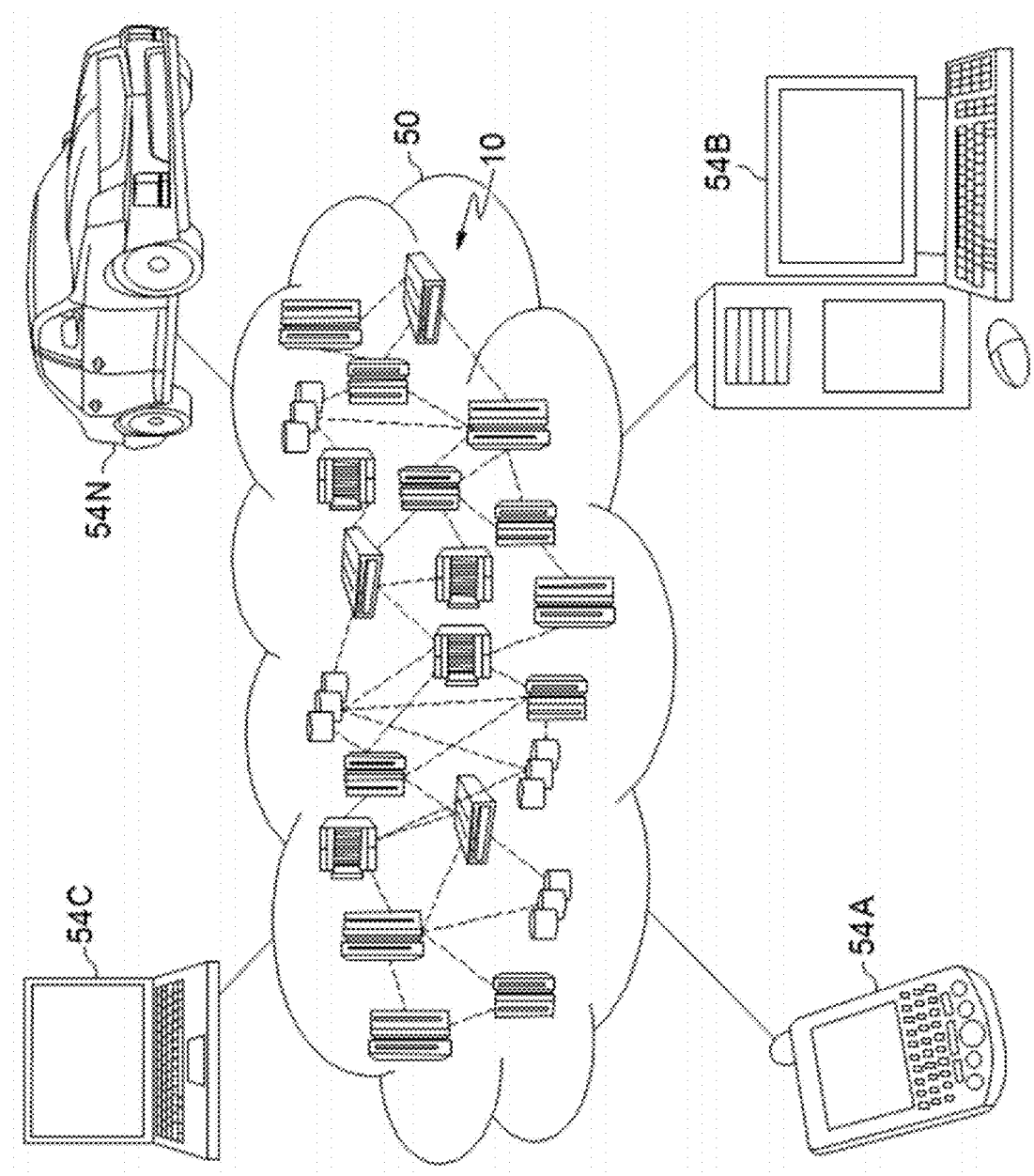
FIG. 4 depicts a cloud computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
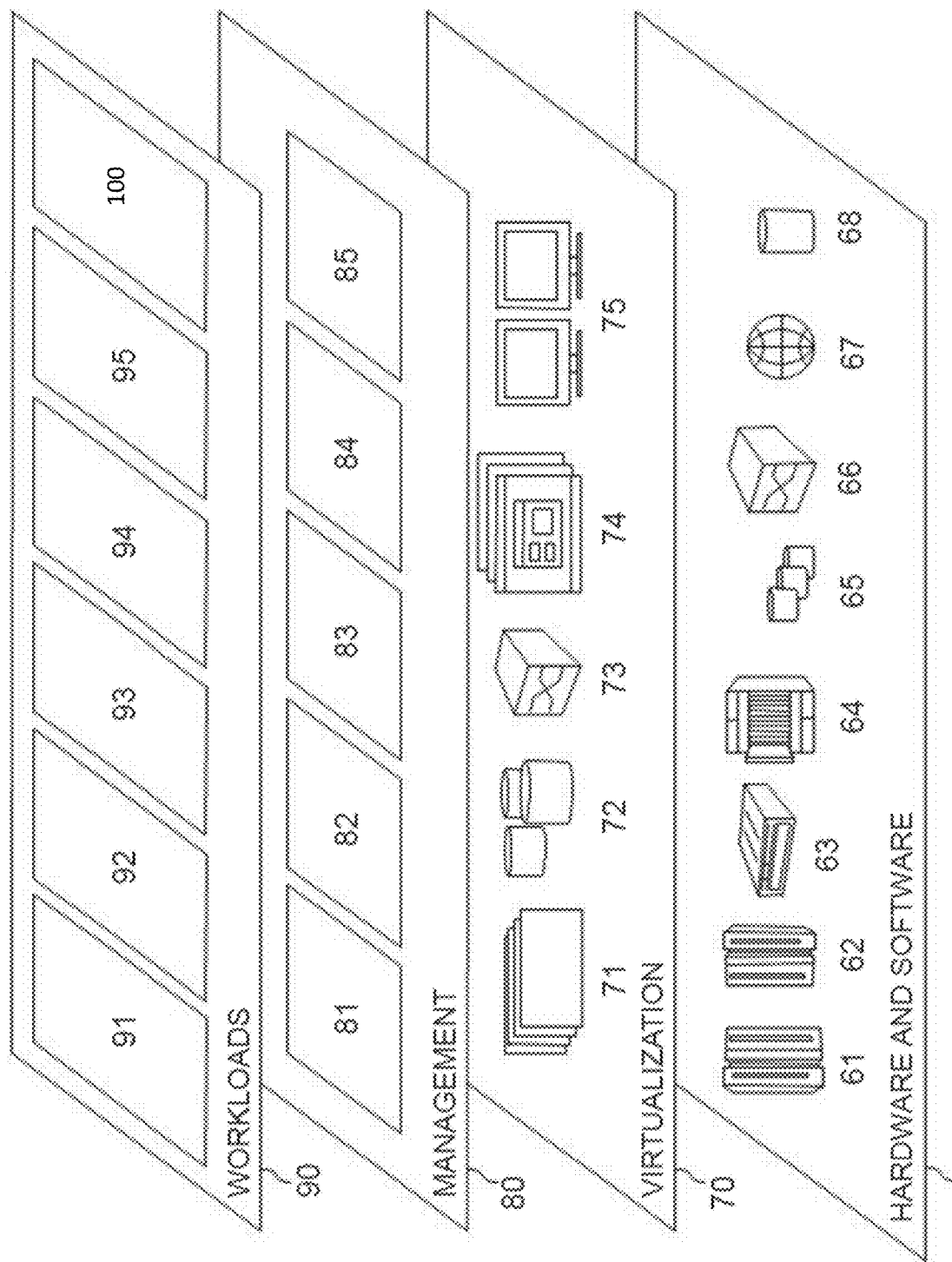
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, more particularly relative to the present invention, the support method 100.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented support method of facilitating interaction between a remote engineer and a local engineer, the method comprising:
   identifying a repair or a maintenance task;
   determining an expertise level of the local engineer and the remote engineer, the expertise level being models by an information model that revolves around devices, a piece of knowledge, the local engineer, and the repair or maintenance task,
   receiving a procedure for performing the repair or the maintenance task, relative to a specific machinery and issue with the specific machinery and outcome using the procedure, the procedure including a series of steps, instructional information associated with each step, and technical information associated with the repair or the maintenance task;
   based on the expertise level of the local engineer and the remote engineer, filtering the instructional information, and the technical information in the procedure, to exclude the instructional and technical information already known by the local engineer and the remote engineer by:
   analyzing each step in the series of steps for the procedure;
   examining a required knowledge for each step by analyzing associated texts to each step;
   comparing the required knowledge to a knowledge level of a profile of the local engineer and the remote engineer; and
   removing steps in the series of steps to complete the procedure when a result of the comparing concludes the knowledge level of each engineer is greater than the required knowledge;
   presenting, via a mixed reality device, a first step of the filtered series of steps and the associated filtered information;
   presenting to the remote engineer, via the mixed reality device, imagery of the local engineer's environment and the equipment;
   presenting to the local engineer, via the mixed reality device, the first step of the filtered series of steps and the associated filtered information;
   observing ongoing work of the local engineer, including completion time of tasks, and command entry mistakes as reflected in error feedback; and
   reacting to syntax errors of ongoing work by offering additional instructional information suitable to the syntax errors,
   wherein repeated syntax errors prompt an offer to display help documentation for a particular command causing the repeated syntax errors,
   wherein the mixed reality perception is blended with actual machine interfaces to create blended actual machine interfaces combining the equipment, the imagery of the local engineer's environment and the mixed reality perception,
   wherein the blended actual machine interfaces are configured to be manipulated by the local engineer via the mixed reality device, and
   wherein the blended actual machine interfaces include blended objects that are manipulated to display a separate display that is associated with an object of the equipment visible to the local engineer and is configured to be manipulated via a touch by a user.

2. The computer-implemented method of claim 1, further comprising:
   based on the completion of maintenance task, presenting to the remote engineer a report on the local engineer's work, step by step; and
   based on the completed maintenance task, accepting from the remote engineer an evaluation of the local engineer's work, rating progress and quality of work, for each step, and processing this evaluation to form an updated profile of the local engineer.

3. The computer-implemented method of claim 2, wherein the presenting presents a same presentation to the remote engineer and the local engineer, via the mixed reality device,
   wherein the presentation for the remote engineer is rendered in the local engineer's view via the mixed reality device, and
   wherein the local engineer's activities are presented for the remote engineer with a component associated with the local engineer's view of a physical device requiring the repair or the maintenance task.

4. The computer-implemented method of claim 1, embodied in a cloud-computing environment.

5. The method of claim 1, wherein the identifying, the determining, the receiving, and the filtering are continuously looped,
   wherein the information model revolves around the devices (D'), the piece of knowledge (K'), the local engineer (E'), and the repair or the maintenance task (J') where each device D' includes multiple pieces of knowledge K'(D') about device D', which are considered particular sections of its manuals, and associated with one or more devices is a job J'(D*, K*), which works with a set of devices D* and pieces of knowledge K* that are relevant to those devices for this job, and
   wherein on an other side of the model is the remote engineer who has multiple pieces of knowledge known by the remote engineer K'(D').

6. The method of claim 1, wherein the separate display includes information about the object, and
   wherein the manipulating includes an action that changes a display of the blended actual machine interfaces.

7. The computer-implemented method of claim 1, wherein the physical touch by the user causes the blended objects to expand or contract, move out of the way, be removed, and drill down.

8. A computer program product for facilitating interaction between a remote engineer and a local engineer, the computer program product comprising a computer-readable storage medium having program instructions embodied therewith, the program instructions executable by a computer to cause the computer to perform:
   identifying a repair or a maintenance task;
   determining an expertise level of the local engineer and the remote engineer, the expertise level being models by an information model that revolves around devices, a piece of knowledge, the local engineer, and the repair or maintenance task,
   receiving a procedure for performing the repair or the maintenance task, relative to a specific machinery and issue with the specific machinery and outcome using the procedure, the procedure including a series of steps, instructional information associated with each step, and technical information associated with the repair or the maintenance task;
   based on the expertise level of the local engineer and the remote engineer, filtering the instructional information, and the technical information in the procedure, to exclude the instructional and technical information already known by the local engineer and the remote engineer by:
  analyzing each step in the series of steps for the procedure;
  examining a required knowledge for each step by analyzing associated texts to each step;
  comparing the required knowledge to a knowledge level of a profile of the local engineer and the remote engineer; and
  removing steps in the series of steps to complete the procedure when a result of the comparing concludes the knowledge level of each engineer is greater than the required knowledge;
presenting, via a mixed reality device, a first step of the filtered series of steps and the associated filtered information;
presenting to the remote engineer, via the mixed reality device, imagery of the local engineer's environment and the equipment;
presenting to the local engineer, via the mixed reality device, the first step of the filtered series of steps and the associated filtered information;
observing ongoing work of the local engineer, including completion time of tasks, and command entry mistakes as reflected in error feedback; and
reacting to syntax errors of ongoing work by offering additional instructional information suitable to the syntax errors,
wherein repeated syntax errors prompt an offer to display help documentation for a particular command causing the repeated syntax errors,
wherein the mixed reality perception is blended with actual machine interfaces to create blended actual machine interfaces combining the equipment, the imagery of the local engineer's environment and the mixed reality perception,
wherein the blended actual machine interfaces are configured to be manipulated by the local engineer via the mixed reality device, and
wherein the blended actual machine interfaces include blended objects that are manipulated to display a separate display that is associated with an object of the equipment visible to the local engineer and is configured to be manipulated via a touch by a user.

9. The computer program product of claim 8, further comprising:
  based on the completion of maintenance task, presenting to the remote engineer a report on the local engineer's work, step by step and as a whole; and
  based on the completed maintenance task, accepting from the remote engineer an evaluation of the local engineer's work, rating progress and quality of work, and processing this evaluation to form an updated profile of the local engineer.

10. The computer program product of claim 9, wherein the presenting presents a same presentation to the remote engineer and the local engineer, via the mixed reality device,
  wherein the presenting for the remote engineer is rendered in the local engineer's view, and
  wherein the local engineer's activities are presented for the remote engineer with a component associated with the local engineer's view of a physical device requiring the repair or the maintenance task.

11. A support system for facilitating interaction between a remote engineer and a local engineer, said system comprising:
  a processor; and
  a memory, the memory storing instructions to cause the processor to perform:
    identifying a repair or a maintenance task;
    determining an expertise level of the local engineer and the remote engineer;
    receiving a procedure for performing the repair or the maintenance task, relative to a specific machinery and issue with the specific machinery and outcome using the procedure;
    based on the expertise level of the local engineer and the remote engineer, filtering the instructional information, and the technical information in the procedure, to exclude the instructional and technical information already known by the local engineer and the remote engineer;
    presenting to the remote engineer, via a mixed reality device, imagery of the local engineer's environment and the equipment;
  wherein the mixed reality perception is blended with actual machine interfaces to create blended actual machine interfaces combining the equipment, the imagery of the local engineer's environment and the mixed reality perception,
  wherein the blended actual machine interfaces are configured to be manipulated by the local engineer via the mixed reality device, and
  wherein the blended actual machine interfaces include blended objects that are manipulated to display a separate display that is associated with an object of the equipment visible to the local engineer and is configured to be manipulated via a touch by a user.

12. The system of claim 11, further comprising:
  based on the completion of maintenance task, presenting to the remote engineer a report on the local engineer's work, step by step and as a whole; and
  based on the completed maintenance task, accepting from the remote engineer an evaluation of the local engineer's work, rating progress and quality of work, and processing this evaluation to form an updated profile of the local engineer.

13. The system of claim 12, wherein the presenting presented a same presentation to the remote engineer and the local engineer, via the mixed reality device,
  wherein the presenting for the remote engineer is rendered in the local engineer's view, and
  wherein the local engineer's activities are presented for the remote engineer with a component associated with the local engineer's view of a physical device requiring the repair or the maintenance task.

14. The system of claim 11, embodied in a cloud-computing environment.

* * * * *